US010013789B2

(12) United States Patent
Verkoeyen et al.

(10) Patent No.: US 10,013,789 B2
(45) Date of Patent: Jul. 3, 2018

(54) COMPUTERIZED MOTION ARCHITECTURE

(71) Applicant: GOOGLE INC., Mountain View, CA (US)

(72) Inventors: Jeffrey David Verkoeyen, New York, NY (US); Randall Li, New York, NY (US)

(73) Assignee: Google LLC, Mountain View, CA (US)

( * ) Notice: Subject to any disclaimer, the term of this patent is extended or adjusted under 35 U.S.C. 154(b) by 297 days.

(21) Appl. No.: 14/948,146

(22) Filed: Nov. 20, 2015

(65) Prior Publication Data
US 2017/0148202 A1 May 25, 2017

(51) Int. Cl.
| *G06T 13/80* | (2011.01) |
| *G09G 5/36* | (2006.01) |
| *G06F 3/0484* | (2013.01) |
| *G06F 3/14* | (2006.01) |
| *G06F 17/22* | (2006.01) |

(52) U.S. Cl.
CPC ............ *G06T 13/80* (2013.01); *G06F 3/0484* (2013.01); *G06F 3/1423* (2013.01); *G06F 17/2247* (2013.01); *G09G 5/363* (2013.01); *G06T 2213/08* (2013.01)

(58) Field of Classification Search
CPC .......... G06T 9/00; G06T 13/00; G06T 13/20; G06T 13/40; G06T 13/80; G06T 2213/04; G06T 2213/08; G06T 2213/12
USPC ........................................................ 345/474
See application file for complete search history.

(56) References Cited

U.S. PATENT DOCUMENTS

| 5,867,175 | A | * | 2/1999 | Katzenberger | .......... | G06T 13/00 |
| | | | | | | 345/473 |
| 2004/0222992 | A1 | | 11/2004 | Calkins et al. | | |
| 2006/0232589 | A1 | | 10/2006 | Glein | | |

(Continued)

FOREIGN PATENT DOCUMENTS

WO     2007008853 A2     1/2007

OTHER PUBLICATIONS

Brian Birtles, et. al. "Web Animations". Typescript, Jul. 7, 2015. http://www.w3.org/TR/web-animations/ Last Accessed: Nov. 20, 2015.

(Continued)

*Primary Examiner* — Sae Won Yoon
(74) *Attorney, Agent, or Firm* — Troutman Sanders LLP; James E. Schutz; Brennan M. Carmody

(57) ABSTRACT

A computing system is presented including a processor and non-transient memory which includes instructions to execute a method including receiving a motion instruction message which includes graphical objects to be modified and instructions to be assigned to each of the graphical objects to be modified, where an instruction includes a property to be applied to a graphical object. The method also includes identifying actors to be assigned to each of the graphical objects based on the instructions assigned to each of the graphical objects, where an actor is a non-graphical object capable of executing one or more instructions. The method also includes generating the actors for each of the graphical objects, executing the instructions assigned to each of the graphical objects via the actors, and outputting the modified graphical objects for display.

18 Claims, 4 Drawing Sheets

(56) References Cited

U.S. PATENT DOCUMENTS

| | | | | |
|---|---|---|---|---|
| 2007/0013699 | A1* | 1/2007 | Nelson | G06T 13/00 345/473 |
| 2012/0169711 | A1* | 7/2012 | Penttila | H04N 13/0454 345/419 |
| 2012/0262483 | A1* | 10/2012 | Kim | G09G 5/14 345/629 |
| 2013/0063446 | A1 | 3/2013 | Lau et al. | |

OTHER PUBLICATIONS

"QS-Animation-Houdini 3D Animation Tools". Web Tutorial. Side Effects Software. https://www.sidefx.com/index.php?option=com_content&task=blogcategory&id=250&Itemid=405 Last Accessed: Nov. 20, 2015.

\* cited by examiner

COMPUTERIZED MOTION ARCHITECTURE

BACKGROUND

Interactivity and animation (hereafter "motion") are important aspects of modern software, but have no clear place in classical software design architectures. This leads to complex implementations that are neither modular nor extensible. Motion is typically an afterthought of the software engineering process and engineering teams pay the cost of this afterthought in maintenance and lack of portability. Core Animation is one animation technology which powers most of the iOS operating system. This technology includes a render server (a separate process) and a set of animation types including "basic" animations from one value to another, "keyframe" animations over an array of key frames, and "emitters" which generate views that follow a particle effect. Web animation is another animation technology which powers HTML animations and is a Javascript standard defined by the W3C.

SUMMARY

A system is presented including a processor, and non-transient memory which is operatively connected to the processor. The non-transient memory includes instructions which, when executed by the processor, cause the processor to execute a method. The method includes receiving a motion instruction message, where the motion instruction message includes one or more graphical objects to be modified and one or more instructions to be assigned to each of the one or more graphical objects to be modified. An instruction includes an animation property to be applied to a graphical object. The method also includes identifying one or more types of actors to be assigned to each of the one or more graphical objects, based on the one or more instructions assigned to each of the one or more graphical objects. An actor is a non-graphical object capable of executing one or more instructions. The method also includes generating the one or more actors assigned to each of the one or more graphical objects and executing the one or more instructions assigned to each of the one or more graphical objects via the one or more actors.

In another implementation a system is presented including a processor and non-transient memory operatively connected to the processor. The non-transient memory includes instructions which, when executed by the processor, cause the processor to execute a method including receiving user input, determining, based on the user input, if motion is required, and generating a motion instruction message. The motion instruction message includes one or more graphical objects to be modified and one or more instructions assigned to each of the one or more graphical objects to be modified. An instruction includes an animation property to be applied to a graphical object.

In another implementation, a system is presented including a processor, and non-transient memory which is operatively connected to the processor. The non-transient memory includes instructions which, when executed by the processor, cause the processor to execute a method. The method includes receiving user input, determining, based on the user input, if motion is required, and generating a motion instruction message. The motion instruction message includes one or more graphical objects to be modified and one or more instructions assigned to each of the one or more graphical objects to be modified. An instruction includes an animation property to be applied to a graphical object. The method also includes identifying one or more types of actors to be assigned to each of the one or more graphical objects, based on the one or more instructions assigned to each of the one or more graphical objects. An actor is a non-graphical object capable of executing one or more instructions. The method also includes generating the one or more actors for each of the one or more graphical objects and executing the one or more instructions assigned to each of the one or more graphical objects via the one or more actors.

DETAILED DESCRIPTION

Some implementations of the system presented in this disclosure allow motion features (interactive and animated features) of an application to be implemented in a universal and operating system-independent package. Some implementations of the system may also improve the efficiency with which motion features use processing power and memory. To accomplish this, the motion features may be implemented by an operating system-independent motion engine which communicates with an operating-system dependent motion controller. For any given motion effect, or group of effects, the motion controller may prepare a motion instruction message, which describes the subjects (graphical objects) of the motion effects and the motion effects (instructions) to be assigned to each of them. Upon receiving the motion instruction message, the motion engine deciphers it and determines which graphical objects require motion and which actors are needed to execute the motion. If any new graphical objects are required, the motion engine may create them. If any new actors are required, the motion engine may create them as well. The actors then execute the required motion.

As used herein, an object can be a variable, a data structure, or a function. An object may have one or more state properties, one or more behavioral properties, or both. For example, a "graphical object" may refer to a visual element of a GUI and the underlining data, process, and/or subroutine that it represents. Similarly, "property" may refer to variables and data that define the appearance and behavior of a graphical object, especially with regard to motion as described above. An "instruction" may refer to a direction or intention to alter one or more properties of an object, for example a specific graphical object. An "actor" may refer to a non-graphical object (e.g. a software process or a subroutine) capable executing or implementing instructions, as defined above, by changing one or more properties of a graphical object.

Figure 1:
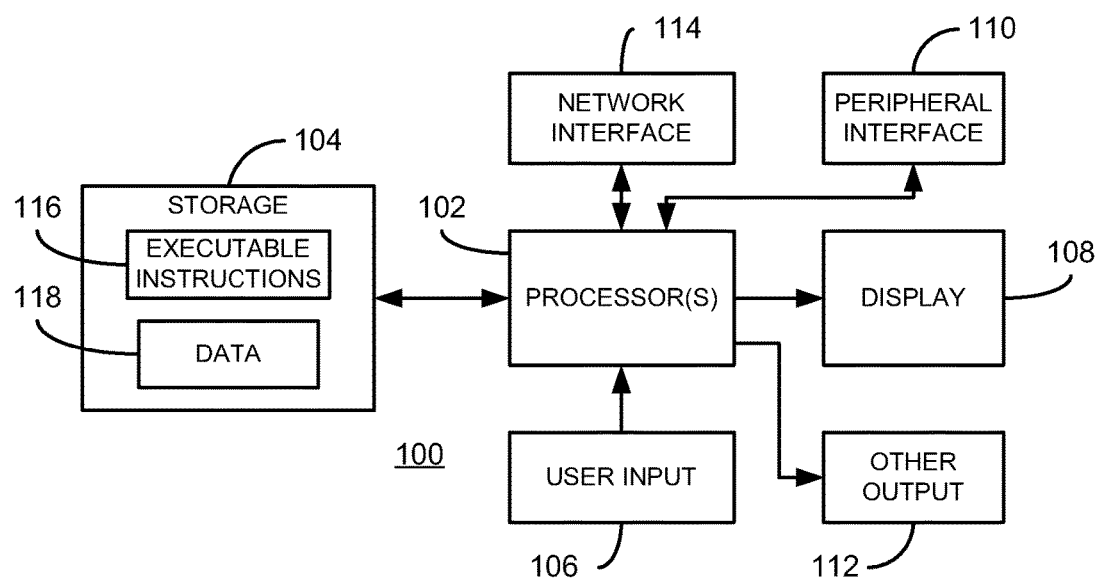
FIG. 1 is a block diagram of a computing system for use with the computerized motion architecture illustrating the functional relationships between its components in accordance with the present disclosure.

Referring now to the Figures, in which like reference numerals represent like parts, various implementations of the computing devices and methods will be disclosed in detail. FIG. 1 is a block diagram illustrating one example of a computing device 100 suitable for use with the disclosed computerized motion architecture.

FIG. 1 depicts a block diagram of an illustrative computing device architecture 100, according to an example implementation. As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to some implementations of the disclosed technology, the display interface 106 may be directly connected to a local display, such as a touch-screen display associated with a mobile computing device. In another example implementation, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some implementations, the display interface 106 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example implementation, the computing device architecture 100 may include a presence-sensitive display interface 107 for connecting to a presence-sensitive display. According to certain some implementations of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. According to certain implementations, a camera interface 114 is provided that acts as a communication interface and provides functions for capturing digital images from a camera. According to certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components. According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device may be coupled, connected, and/or in communication with one or more peripheral devices, such as display. In another example implementation, the term computing device, as used herein, may refer to a mobile computing device such as a smartphone or tablet computer. In this example implementation, the computing device may output content to its local display and/or speaker(s). In another example implementation, the computing device may output content to an external display device (e.g., over Wi-Fi) such as a TV or an external computing system.

In some implementations of the disclosed technology, the computing device may include any number of hardware and/or software applications that are executed to facilitate any of the operations. In some implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
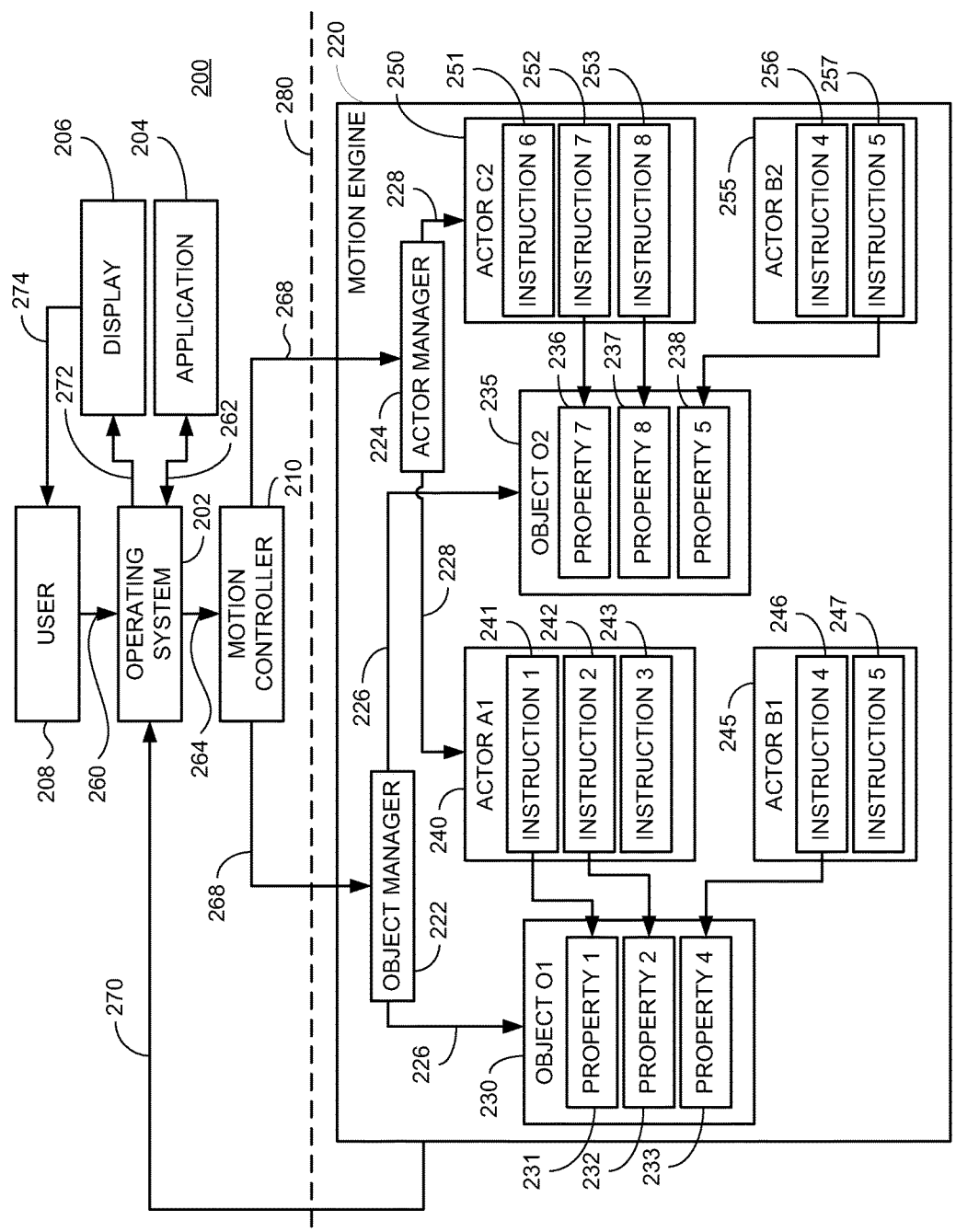
FIG. 2 is a block diagram of the computerized motion architecture illustrating the functional relationships between its components and the remainder of a computing system, in accordance with the present disclosure.

FIG. 2 is a block diagram of the computerized motion architecture illustrating the functional relationships between its components and the remainder of a computing system. In its simplest implementation, the computerized motion architecture 200 includes a motion controller 210 and a motion engine 220 operatively connected to an operating system 202, an application 204, and a display device 206. In operation, the operating system 202 obtained input 260 from a user 208. If necessary, the operating system 202 communicates with the application 206 to determine what motion, if any, is necessary from the computerized motion architecture 200. If motion is required, the operating system 202 instantiates a motion controller 210 to control the motion and communicates the requested motion 264. The motion controller 210 generates a motion instruction message 268 based on the requested motion 264. The motion controller 210 communicates the motion instruction message 268 to a motion engine 220, which distributes the motion instruction message 268 to a graphical object manager 224 and an actor manager 224. If necessary, the motion controller 210 also instantiates a new motion engine 220 for the requested motion 264.

The motion instruction message 268 includes a list of one or more graphical objects and motion instructions for those one or more graphical objects. In response to the motion instruction message 268, the graphical object manager 222 instantiates 226 any necessary graphical objects 230, 235 which don't already exist. The graphical objects 230, 235 will be the subjects of the requested motion 264. Likewise, if a graphical object 230, 235 is no longer needed, the graphical object manager 222 dismisses it from memory (not shown).

Also in response to the motion instruction message 268, the actor manager 224 determines what types of actors are required to execute the motion instructions in the motion instruction message 268. The actor manager 224 then instantiates the necessary actors 240, 245, 250, 255 and assigns them to graphical objects 230, 235. Multiple actor types (e.g. A, B, and C) are available, each actor type specialized to execute families of motion instructions. For example, and not in limitation, actor types may be specialized for time-based animation (translation, rotation, flexion, etc.), gestural interaction (dragging, dropping, expanding, contracting, etc.), spatial interaction (using movement of a computing device to drive the animation) and physically-simulated animation (gravity effects, rebounding effects, etc.). In one example implementation, spatial interaction may include using a gyroscope and/or inertial dead reckoning from an accelerometer to measure orientation of a computing device and drive a corresponding animation. In another example implementation, spatial interaction may include using an accelerometer to measure displacement of a computing device and drive a corresponding animation. In another example implementation, spatial interaction could be used to adjust the camera perspective in a virtual or augmented reality system. Developers can also create new types of instructions and new types of actors which can be incorporated into the architecture as required.

The actors execute the instructions by altering properties of the graphical objects. For example, in the implementation illustrated in FIG. 2, actor A1 (actor type "A", assigned to graphical object O1) 240 may be specialized for time-based animation and capable of executing three time-based animation instructions 241, 242, 243. For example, the motion instruction message 268 may direct graphical object O1 230 to move linearly 241 across the screen and rotate 242 at the same time. Actor A1 240 is capable of executing these instructions by altering corresponding properties 231, 232 of graphical object O1 230. However, actor A1 may be capable of executing additional instructions 243 which are not currently needed for graphical object O1. Graphical object O1 230 may also have a gestural instruction assigned to it, such as being expandable in the GUI. Actor B1 245 is capable of executing this instruction 246 by altering a corresponding property 233 of graphical object O1 230.

However, actor B1 may be capable of executing additional instructions 247 which are not currently needed for graphical object O1.

As a further example, the motion instruction message 268 may direct graphical object O2 235 to be draggable 257 in the GUI and to respond to "gravity" 252 (e.g., to be drawn toward the bottom of the screen) and to have a coefficient of restitution 253 (e.g. to "bounce" when it reaches the edge of the display). Actor B2 255 is capable of executing the gestural instruction 257 by altering a corresponding property 238 of graphical object O2 235. However, actor B2 255 may also be capable of executing additional instructions 256 which are not currently needed for graphical object O2 235. Actor C1 250 is capable of executing the physical simulation instructions 252, 253 by altering the corresponding properties 236, 237 of graphical object O1 230. However, actor B1 may also be capable of executing additional instructions 251 which are not currently needed for graphical object O2.

After the actors execute their instructions, the motion engine 220 sends a message 270 with all of the graphical objects and their properties back to the operating system 202. The operating system 202 then renders a screen image 272 based on the graphical objects and their properties and sends the image 272 to the display 206 to be output 274 to the user.

The motion engine 220 may be operating-system agnostic, environment agnostic, and platform agnostics. Therefore, in some implementations, the motion controller 210 and the motion engine 220 may exist in separate processes, platforms, or even in separate devices. This property of the motion engine 220 makes the architecture more portable between operating systems, programming languages, environments, and devices. In one example implementation, the same motion engine 220 may be deployed in the same application for multiple operating systems (e.g. iOS, Android, Windows, Linux). Each operating system would generate specific motion controllers 210, but these motion controllers 210 would generate identical motion instruction messages 268 which would be communicated to identical motion engines 220. This feature of the computerized motion architecture greatly enhances the portability of a particular motion engine between platforms, simplifying application development.

In another example implementation, the motion controller 210 may be implemented in one platform (e.g. HTML or Javascript) while the motion engine 220 may be implemented in another platform (e.g. iOS, Windows, Linux, etc.) This feature again improves the portability of the architecture and also imparts additional functionality. For example, if the motion engine 220 may be implemented in HTML or Javascript, that simplifies controlling motion via a web portal, e.g., for a web-based game or application.

In another example implementation, the motion controller 210 may be implemented on a different device than the motion engine 220. For example, this implementation would allow a relatively underpowered device like a mobile phone or tablet to use a more powerful computer to generate its motion effects. In another example, a wearable device (e.g. smart watch) can use the greater processing power of a mobile phone or tablet to generate its motion effects. This feature allows the weaker device to implement motion graphics it might not otherwise be capable of and promotes scalability of motion effects.

Figure 3:
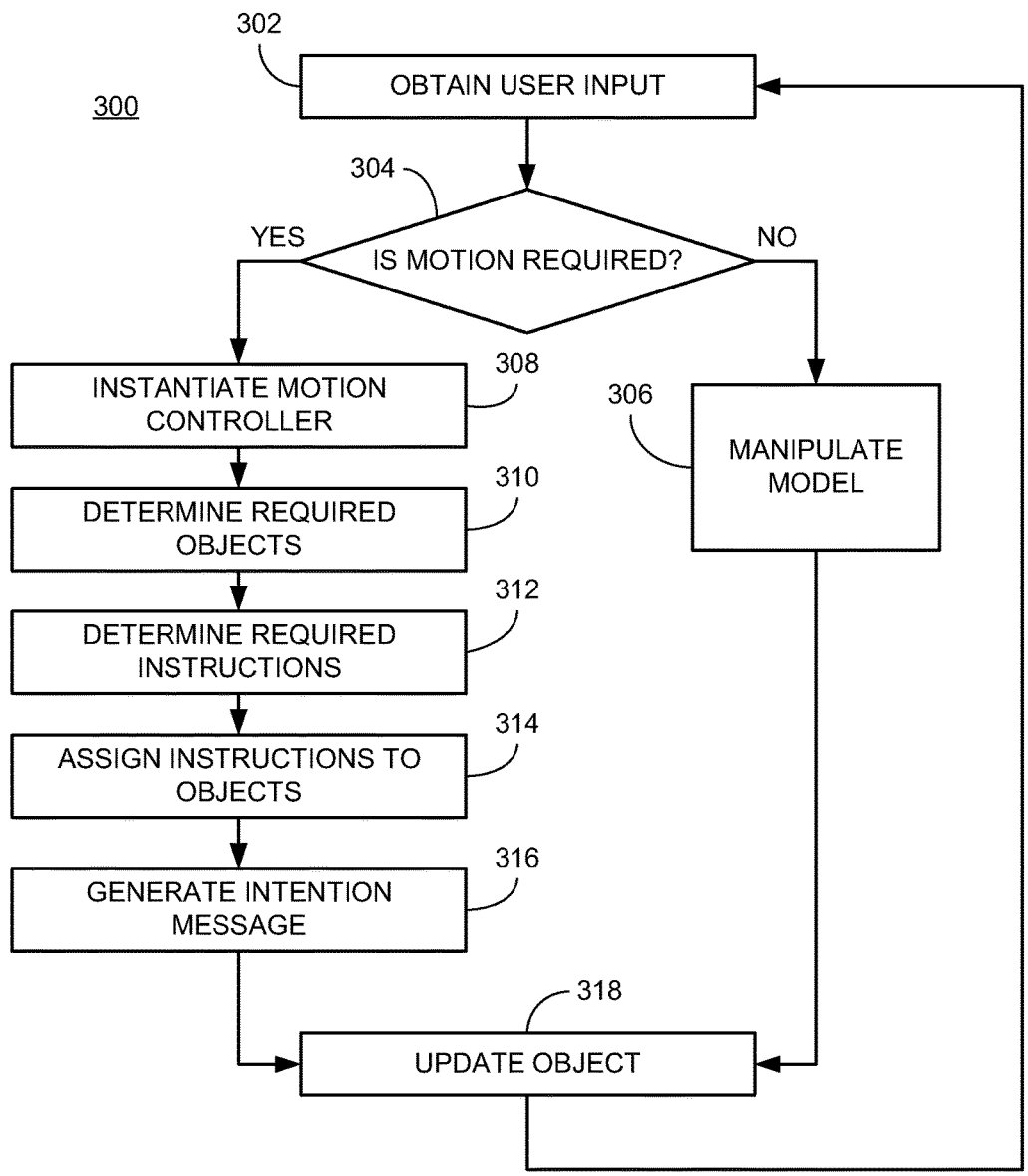
FIG. 3 is a flowchart illustrating actions taken by the operating system upon receiving motion-related input from a user in accordance with the present disclosure.

FIG. 3 is a flowchart illustrating actions 300 taken by the operating system 202 and the motion controller 210 upon receiving motion-related input from a user in accordance. At 302 the operating system 202 obtains user input. At 304 the operating system 202 determines if the user input requires motion. If not, the operating system 202 manipulates the GUI model 306 and updates the graphical object 318 in the conventional method of rendering graphics. If motion is required, the operating system 202 instantiates the motion controller 210 at 308, if the motion controller 210 is not already present. At 310 the motion controller 210 determines what graphical objects are affected by the user's input. At 312 the motion controller 210 determines what motion instructions are required by the user's input. At 314 the motion controller 210 assigns the instructions to the graphical objects. At 316 the motion controller 210 generates the motion instruction message 268 and sends it to the motion engine 220 which updates 318 the graphical objects.

Figure 4:
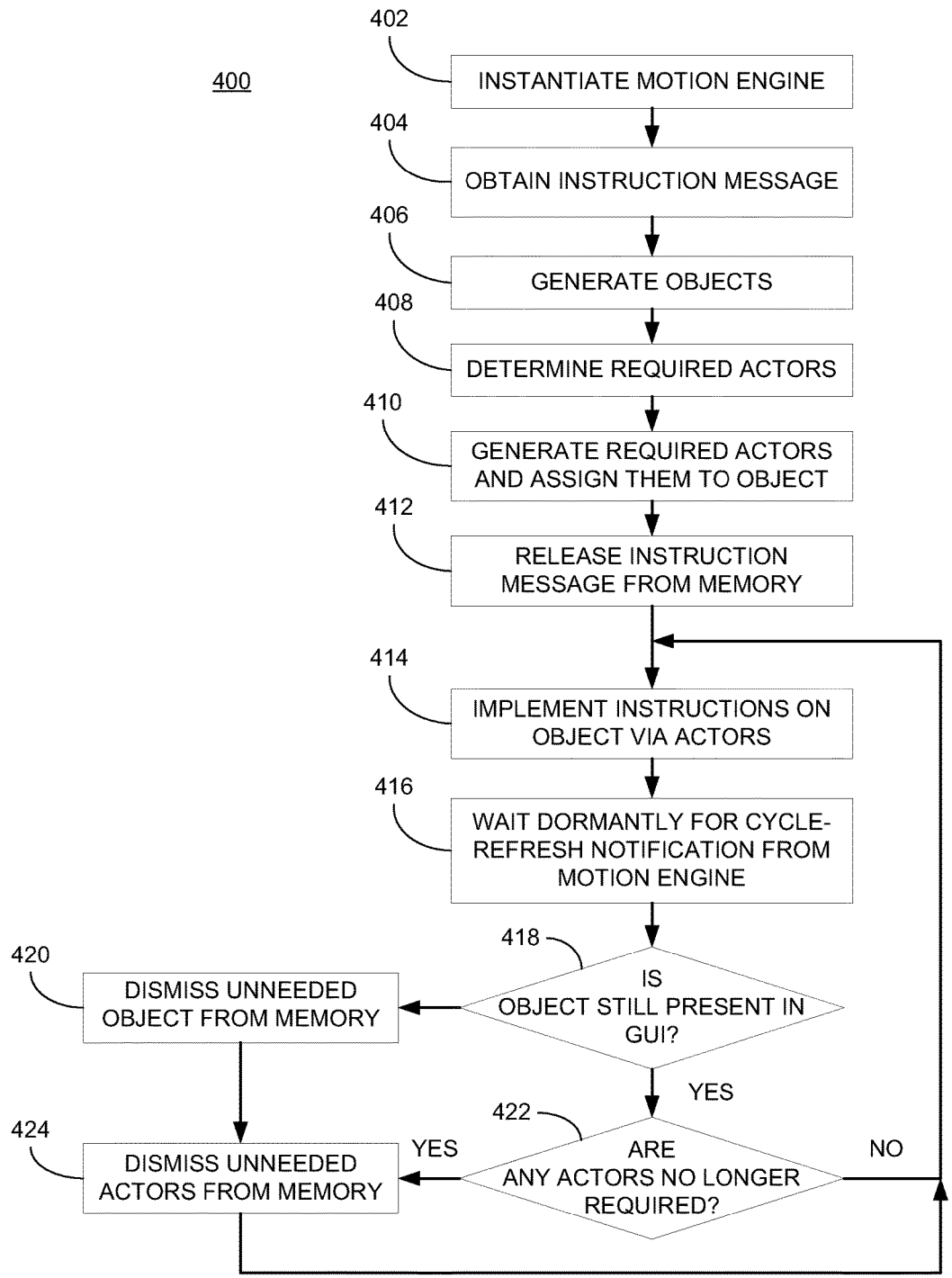
FIG. 4 is a flowchart illustrating operation of the computerized motion architecture, in accordance with the present disclosure.

FIG. 4 is a flowchart illustrating operation 400 of the motion engine 220 in accordance with the present disclosure. At 402 the motion engine 220 is instantiated. At 404 the motion engine 220 obtains a motion instruction message 268. At 406 the graphical object manager generates any new graphical objects required by the motion instruction message 268. At 408 the actor manager identifies what types of actors are required for each graphical object based on the motion instruction message 268. At 410 the actor manager generates the required actors and assigns them to the appropriate graphical objects. At 412 the motion instruction message 268 is released from memory, conserving memory capacity. At 414 the actors execute the instructions assigned to them on their designated graphical objects. At 416 the actors wait dormantly for the next refresh cycle which requires action from the actors. In one implementation, waiting dormantly means executing or requiring fifty percent fewer calculations per unit time than during activity. In another example implementation, waiting dormantly means executing or requiring seventy-five percent fewer calculations per unit time than during activity. In another example implementation, waiting dormantly means executing or requiring ninety percent fewer calculations per unit time than during activity. The actors will wait indefinitely before acting for as long as their assigned graphical objects remain. This is an important difference from other operating systems 202 which continuously cycle a run loop, needlessly consuming memory and processing power.

At 418 the motion engine 220 checks if each graphical object is still present in the GUI. For example, a graphical object may be dragged and dropped into another location, at which point it's no longer present in the GUI and is needlessly consuming memory and processing resources. If the graphical object is no longer present, it is dismissed from memory at 420 and its associated actors are dismissed from memory at 424. At 422 the motion engine 220 determines if any of the actors associated with the remaining graphical objects are no longer needed. For example, a graphical object in the GUI might initially be draggable (a gestural motion). After a user input, the graphical object may no longer be draggable, for example if the graphical object is "grayed out" to prevent selecting it. In this case, the gestural actor assigned to that graphical object is no longer needed. At 424 the unneeded actor(s) is dismissed from memory to prevent unnecessarily consuming memory and processing resources. The actors may then wait for the next refresh cycle from the motion engine 220, until all of the graphical objects are dismissed.

To facilitate an understanding of the principals and features of the disclosed technology, example implementations are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

The design and functionality described in this application is intended to be an example and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, a graphical object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of this technology are described above with reference to block and flow diagrams of computing devices and methods and/or computer program products according to example implementations of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, some implementations of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of this disclosure have been described in connection with what is presently considered to be the most practical and various implementations, it is to be understood that this disclosure is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the technology and also to enable any person skilled in the art to practice certain implementations of this technology, including making and using any apparatuses or systems and performing any incorporated methods. The patentable scope of certain implementations of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a processor;
   non-transient memory, operatively connected to the processor, the non-transient memory comprising instructions which, when executed by the processor, cause the processor to execute a method comprising:
   receiving a motion instruction message, where the motion instruction message comprises one or more graphical objects to be modified and one or more instructions to be assigned to each of the one or more graphical objects to be modified, where an instruction of the one or more instructions comprises a property to be applied to a graphical object;
   identifying one or more types of actors to be assigned to the each of the one or more graphical objects, based on the one or more instructions assigned to the each of the one or more graphical objects, where an actor is a non-graphical object capable of executing the one or more instructions;
   generating the one or more actors for the each of the one or more graphical objects;
   executing the one or more instructions assigned to the each of the one or more graphical objects via the one or more actors;
   outputting the one or more graphical objects for display;
   waiting dormantly after executing the one or more instructions assigned to the each of the one or more graphical objects until receiving a cycle refresh notification from a software implemented motion engine;
   determining which of the one or more instructions require action for the cycle refresh notification from the motion engine;
   executing, via the one or more actors, those instructions which require action for the cycle refresh notification while remaining actors for remaining instructions of the one or more instructions remain dormant; and
   dismissing the one or more graphical objects after all of the one or more instructions to be assigned to the each of the one or more graphical objects are fulfilled.

2. The system of claim 1, where the method further comprises generating the one or more graphical objects based on the motion instruction message.

3. The system of claim 1, where the method further comprises:
   instantiating the motion engine based on the motion instruction message; and
   dismissing the motion engine when all of the one or more graphical objects are dismissed.

4. The system of claim 1, where the method further comprises checking if the instruction is completed and dismissing the actor assigned to that instruction.

5. The system of claim 1, where the method further comprises determining if the actor assigned to the graphical object is still required and dismissing the actor assigned to the graphical object if the actor assigned to the graphical object is not required.

6. The system of claim 1, where waiting dormantly comprises executing at least 50 percent fewer processing calculations than required to implement the instruction during a same time period.

7. The system of claim 1, where the method further comprises dismissing the motion instruction message after generating the one or more actors for the each of the one or more graphical objects.

8. The system of claim 1, where the method further comprises dismissing the one or more actors for the each of the one or more graphical objects when the each of the one or more graphical objects are dismissed.

9. The system of claim 1, where the method further comprises generating and dismissing the one or more actors for the each of the one or more graphical objects.

10. A system comprising:
    a processor;
    non-transient memory, operatively connected to the processor, the non-transient memory comprising instructions which, when executed by the processor, cause the processor to execute a method comprising:
    receiving user input;
    determining, based on the user input, if motion is required;
    generating a motion instruction message, where the motion instruction message comprises one or more graphical objects to be modified and one or more instructions to be assigned to each of the one or more graphical objects to be modified, where an instruction of the one or more instructions comprises a property to be applied to a graphical object;

identifying one or more actors to be assigned to the each of the one or more graphical objects, based on the one or more instructions assigned to the each of the one or more graphical objects;

generating the one or more actors for the each of the one or more graphical objects;

executing the one or more instructions assigned to the each of the one or more graphical objects via the one or more actors;

waiting dormantly after executing the one or more instructions assigned to the each of the one or more graphical objects until receiving a cycle refresh notification from a software implemented motion engine;

determining which of the one or more instructions require action for the cycle refresh notification from the motion engine;

executing, via the one or more actors, those instructions which require action for the cycle refresh notification while remaining actors for remaining instructions of the one or more instructions remain dormant; and dismissing an actor assigned to the one or more graphical objects if the actor assigned to the one or more graphical object is not required.

11. The system of claim 10, where the one or more graphical objects to be modified are based on the user input.

12. The system of claim 10, where the one or more instructions to be assigned to the each of the one or more graphical objects to be modified are based on the user input.

13. A system comprising:

at least one processor;

at least one non-transient memory, operatively connected to the at least one processor, the at least one non-transient memory comprising instructions which, when executed by the at least one processor, cause the at least one processor to execute a method comprising:

receiving user input;

determining, based on the user input, if motion is required;

generating a motion instruction message, where the motion instruction message comprises one or more graphical objects to be modified and one or more instructions to be assigned to each of the one or more graphical objects to be modified, where an instruction of the one or more instructions comprises a property to be applied to a graphical object;

identifying one or more types of actors to be assigned to the each of the one or more graphical objects to be modified, based on the one or more instructions assigned to the each of the one or more graphical objects, where an actor is a non-graphical object capable of executing the one or more instructions;

generating the one or more actors for the each of the one or more graphical objects;

executing the one or more instructions assigned to the each of the one or more graphical objects via the one or more actors;

outputting the one or more graphical objects for display;

waiting dormantly after executing the one or more instructions assigned to the each of the one or more graphical objects until receiving a cycle refresh notification from a software implemented motion engine;

determining which of the one or more instructions require action for the cycle refresh notification from the motion engine;

executing, via the one or more actors, those instructions which require action for the cycle refresh notification while remaining actors for remaining instructions of the one or more instructions remain dormant; and dismissing the motion instruction message after generating the one or more actors for the each of the one or more graphical objects.

14. The system of claim 13 further comprising:

a first computing device comprising a first processor of the at least one processor and a first memory of the at least one non-transient memory; and a second computing device comprising a second processor of the at least one processor and a second memory of the at least one non-transient memory, where receiving the user input and generating the motion instruction message are performed on the first computing device and identifying the one or more types of actors for the each of the one or more graphical objects to be modified, generating the one or more actors for the each of the one or more graphical objects to be modified, and executing the one or more instructions assigned to the each of the one or more graphical objects to be modified are performed on the second computing device.

15. The system of claim 13, where receiving the user input and generating the motion instruction message are performed in a first software process and identifying the one or more types of actors for the each of the one or more graphical objects to be modified, generating the one or more actors for the each of the one or more graphical objects to be modified, and executing the one or more instructions assigned to the each of the one or more graphical objects to be modified are performed in a second software process.

16. The system of claim 15, wherein the first software process is a software implemented motion controller of a model-view-controller user interface, the motion controller being instantiated by the at least one processor.

17. The system of claim 13, where receiving the user input and generating the motion instruction message are performed in a first programming environment and identifying the one or more types of actors for the each of the one or more graphical objects to be modified, generating the one or more actors for the each of the one or more graphical objects to be modified, and executing the one or more instructions assigned to the each of the one or more graphical objects to be modified are performed in a second programming environment.

18. The system of claim 17, wherein one of the first programming environment and the second programming environment is HTML.

* * * * *